United States Patent
Kwasniewski

(10) Patent No.: US 9,121,496 B2
(45) Date of Patent: Sep. 1, 2015

(54) DRIVE AXLE SYSTEM AND A METHOD OF CONTROL

(75) Inventor: Dale Kwasniewski, Galesburg, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 367 days.

(21) Appl. No.: 13/171,959

(22) Filed: Jun. 29, 2011

(65) Prior Publication Data

US 2013/0006485 A1 Jan. 3, 2013

(51) Int. Cl.
*B60W 40/076* (2012.01)
*F16H 59/66* (2006.01)
*F16H 61/16* (2006.01)

(52) U.S. Cl.
CPC ............... *F16H 59/66* (2013.01); *F16H 61/16* (2013.01); *B60W 2550/142* (2013.01); *F16H 2059/663* (2013.01); *Y10T 74/19* (2015.01)

(58) Field of Classification Search
CPC ......... F16H 61/16; F16H 61/18; F16H 59/66; F16H 2059/663; B60W 2550/142
USPC ........................................................... 701/51
See application file for complete search history.

(56) References Cited

U.S. PATENT DOCUMENTS

| | | | | |
|---|---|---|---|---|
| 4,701,852 | A | * | 10/1987 | Ulveland ..................... 701/64 |
| 5,038,880 | A | * | 8/1991 | Matsuoka et al. ............ 180/179 |
| 6,148,691 | A | * | 11/2000 | Ganski et al. ................ 74/745 |
| 6,237,712 | B1 | | 5/2001 | Lehman et al. |

FOREIGN PATENT DOCUMENTS

JP 2010121672 A * 6/2010

* cited by examiner

*Primary Examiner* — Jerrah Edwards
(74) *Attorney, Agent, or Firm* — Brooks Kushman P.C.

(57) ABSTRACT

A drive axle system and a method of control. Shifting of a drive axle assembly between different speed ranges may be inhibited when the inclination of the vehicle exceeds a threshold value. An inclinometer may be used to detect inclination of the vehicle.

12 Claims, 2 Drawing Sheets

DRIVE AXLE SYSTEM AND A METHOD OF CONTROL

TECHNICAL FIELD

The present application relates to a drive axle system and a method of control.

BACKGROUND

A circuit for two-speed axle shifting is disclosed in U.S. Pat. No. 6,237,712.

SUMMARY

In at least one embodiment, a drive axle system for a vehicle is provided. The drive axle system may include a drive axle assembly, an axle shift unit, and an inclinometer. The drive axle assembly may have first and second speed ranges that provide different drive ratios to a wheel. The axle shift unit may be configured to shift the drive axle assembly between the first and second speed ranges. The inclinometer may detect inclination of the vehicle. The axle shift unit may be inhibited from shifting the drive axle assembly when the inclination of the vehicle exceeds a threshold value.

In at least one embodiment, a method of controlling a drive axle system is provided. The method may include determining whether shifting of a drive axle between a first speed range and a second speed range is requested and providing incline data indicative of a road slope. The incline data may be compared to a threshold value when shifting of the drive axle is requested. The drive axle may be inhibited from shifting between the first speed range and the second speed range when the incline data exceeds the threshold value.

In at least one embodiment, a method of controlling a drive axle system for a vehicle is provided. The method may include determining a current speed range of a two-speed drive axle that is configured to transmit torque to a vehicle traction wheel. The drive axle may be shiftable between a high speed range and a low speed range. A determination may be made whether shifting of the drive axle from the current speed range to a different speed range is requested. An inclination value indicative of inclination of the vehicle may be determined when shifting is requested. The inclination value may be compared to a threshold value. The drive axle may be inhibited from shifting to a different speed range when the inclination value exceeds the threshold value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
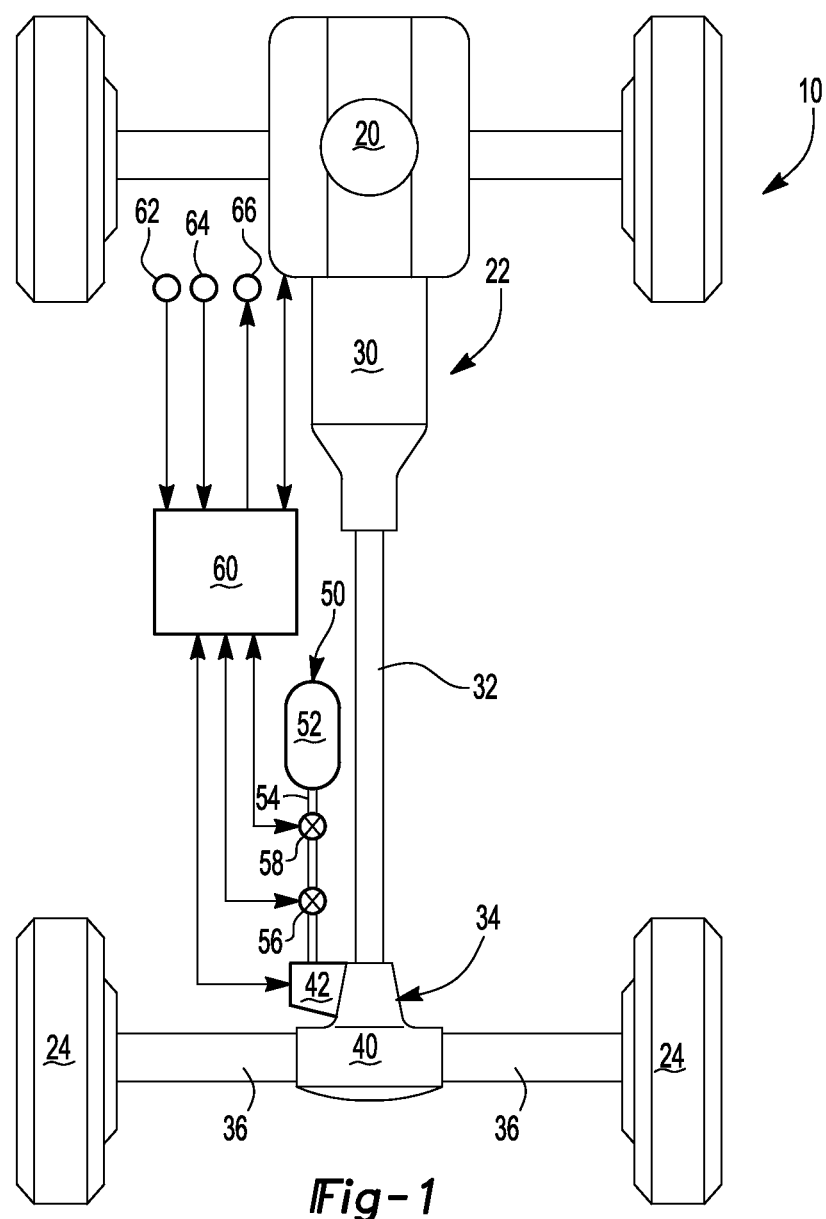
FIG. 1 is a schematic of an exemplary vehicle having a drive axle system.

Referring to FIG. 1, an exemplary vehicle 10 is shown. The vehicle 10 may be a motor vehicle, such as a truck, bus, or automobile. The vehicle 10 may include one or more power sources 20 and a drivetrain 22.

The power source 20 may provide power that may be used to rotate one or more traction wheels 24. In FIG. 1, a single power source 20 is shown that may be configured as an internal combustion engine that may be adapted to combust any suitable type of fuel, such as gasoline, diesel fuel, or hydrogen. Alternatively, the present invention contemplates that multiple power sources could be provided, such as may be employed with a hybrid vehicle. In such an embodiment, a power source could be an electric power source, such as a battery, capacitor, or fuel cell, or a non-electric power source, such as a hydraulic power source.

The drivetrain 22 may be driven by one or more power sources 20 to provide torque to one or more traction wheels 24. In a hybrid vehicle configuration, the drivetrain 22 may have any suitable configuration, such as a parallel drive, series drive, or split hybrid drive as is known by those skilled in the art. In FIG. 1, a non-hybrid drivetrain configuration is shown that includes a transmission 30, a driveshaft 32, and a drive axle system 34. The power source 20 may be coupled to the input of the transmission 30. The driveshaft 32 may couple the output of the transmission 30 to the drive axle system 34 in a manner known by those skilled in the art.

The drive axle system 34 may transmit power or drive one or more traction wheels 24 via an associated wheel axle 36. The drive axle system 34 may include an axle assembly 40 and an axle shift unit 42.

The axle assembly 40 may be a multi-speed axle that may provide different drive ratios or speed ranges to a traction wheel 24. In at least one embodiment, the axle assembly 40 may be a two-speed axle having first and second speed ranges. Such speed ranges may also be referred to as a high range and a low range. High range may employ an axle gear ratio that facilitates greater road speed and vehicle fuel economy. Low range may employ a different axle gear ratio that provides increased starting torque and pulling power as compared to the high range. In at least one embodiment, the axle assembly 40 may include a planetary gear set in which a ring gear is used to transmit torque in the high range (e.g., the ring gear rotates, but the planetary gears do not rotate) and planetary gears are used to transmit torque in the low range (e.g., the planetary gears rotate and torque is provided via center pins of the planetary gears).

The axle shift unit 42 may be configured to actuate or shift the axle assembly 40 from one speed range to another. The axle shift unit 42 may employ any suitable power source or power supply system 50 to actuate or execute a shift from one speed range to another. For instance, an electrical, mechanical, or fluid-based power supply system 50 may be employed. An example of a fluid-based power supply system is shown in FIG. 1, which may be pneumatic or hydraulic in one or more embodiments. An electrical power supply system may use an electric motor to shift the axle.

The power supply system 50 may include a pressurized fluid source 52, such as a tank having a pressurized fluid such as air or hydraulic fluid. The pressurized fluid source 52 may be fluidly coupled to the axle shift unit 42 via a conduit 54, such as a tube or pipe. A range control valve 56 may be disposed along the conduit 54 between the pressurized fluid source 52 and the axle shift unit 42. The range control valve 56 may include an actuator, such as a solenoid, that may actuate the range control valve 56 between an open position in which fluid flow is permitted through the range control valve 56 and a closed position in which fluid flow is inhibited.

Optionally, an interrupt valve 58 may be disposed along the conduit 54 between the pressurized fluid source 52 and the range control valve 56. The interrupt valve 58 may include an actuator, such as a solenoid, that may actuate the interrupt valve 58 between an open position in which fluid flow is permitted through the interrupt valve 58 and a closed position in which fluid flow is inhibited.

One or more control modules 60 may be provided to monitor and control various components and systems of the vehicle 10. For example, the control module 60 may be electrically connected to the power source 20, axle shift unit 42, range control valve 56, and interrupt valve 58 to monitor and control their operation and performance. In addition, the control module 60 may also process input signals or data from various input devices or sensors. These input devices may include a shift selector switch 62 and an inclinometer 64. In addition, the control module 60 may also control a device that provides audible and/or visible signals to a vehicle operator, such as an indicator light 66 that may indicate when shifting of the axle assembly 40 is inhibited as will be discussed in more detail below.

The shift selector switch 62 may detect a request by a vehicle operator to shift the axle assembly 40 from one speed range to another. The shift selector switch 62 may detect the position of a shift actuator, such as button, shift knob, or shift lever, that may be actuated by a vehicle operator to request a shift. The shift selector switch 62 may be disposed in a cab or passenger compartment of the vehicle 10. In addition, the shift selector switch 62 may be mounted on a transmission gear shift lever in one or more embodiments.

The inclinometer 64, which may also be called a tilt sensor, slope meter, or gradient meter, may be provided for measuring an angle of slope or inclination of the vehicle 10. Such a measurement may be gravity-based and may be indicative of a road grade or slope of a road or surface upon which the vehicle 10 is disposed. The inclinometer 64 may provide data indicative of the number of degrees at which the vehicle 10 is inclined or declined with respect to an artificial horizon. The inclinometer 64 may be of any suitable type, such as liquid capacitive, electrolytic, pendulum, or accelerometer-based.

Figure 2:
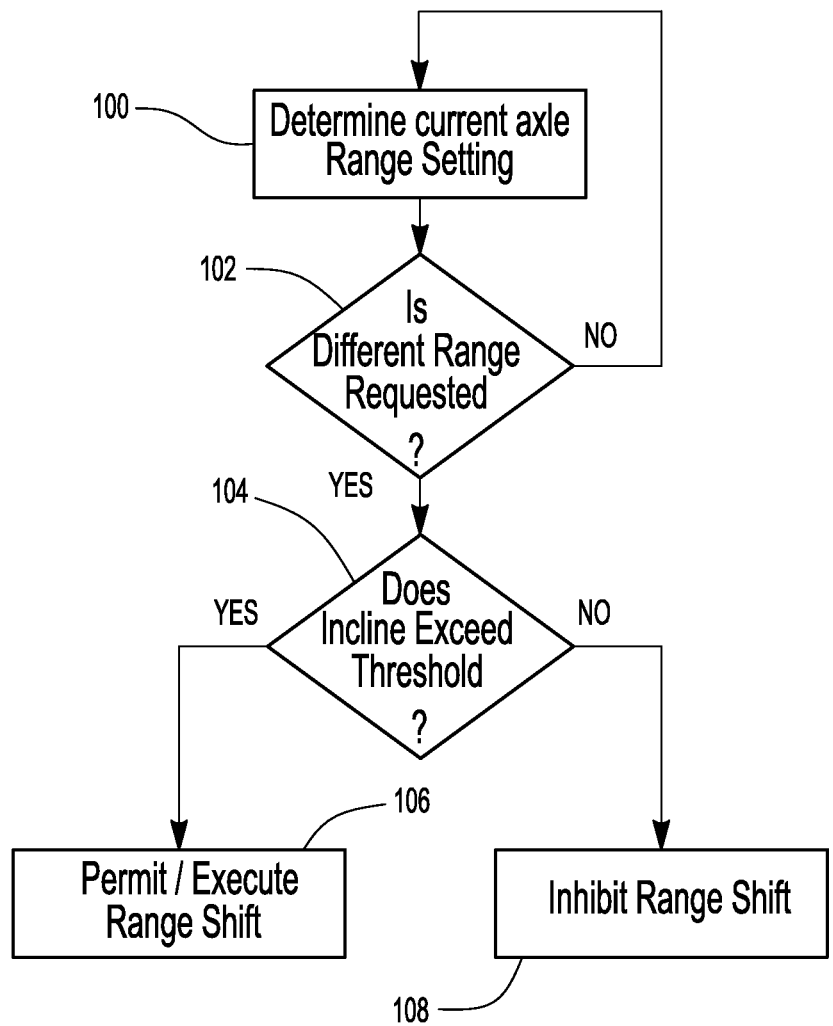
FIG. 2 is a flowchart of an exemplary method of control that may be employed with the drive axle system.

Referring to FIG. 2, a flowchart of an exemplary method of controlling a drive axle system 34 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used to accomplish the objectives, features, and advantages of the present invention.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope of the present invention.

In at least one embodiment of the present invention, the method may be executed by the control module 60 and may be implemented as a closed loop control system. Moreover, the method may be enabled or disabled based the operating state of the vehicle 10.

At block 100, the method may begin by determining a current axle speed range setting. The current axle speed range setting may be based on a signal from the axle shift unit 42 or a position sensor disposed on the axle assembly 40.

At block 102, the method determines whether a shift to a different speed range is requested. A request for a shift from currently selected or engaged speed range to a different speed range may be based on a signal from the shift selector switch 62. If a different speed range is not requested, the method may return to block 100. If a different speed range is requested, the method may continue a block 104.

At block 104, the method determines whether the incline or tilt of the vehicle 10 or road grade exceeds a threshold value. The vehicle tilt or road grade may be based on a signal or data from the inclinometer 64 and may be expressed as an inclinometer value. In at least one embodiment, data from the inclinometer 64 may be processed by the control module 60 in various ways to yield an inclinometer value that may provide a more accurate assessment of the road grade or vehicle tilt. For instance, data from the inclinometer 64 may be used after a predetermined amount of time has elapsed after a shift to different speed range is requested to permit readings from the inclinometer 64 to stabilize. The predetermined amount of time may provide a delay that effectively omits data that may not accurately measure an angle of inclination due to acceleration forces that may be imparted to the detection components of the inclinometer 64. Data from the inclinometer 64 may also undergo calculations or statistical analysis, such as an average or moving average based on a series of data readings, to provide a more accurate evaluation of vehicle tilt over a period of time or in a data sample. Such calculations or statistical analysis techniques may be employed alone or along with a delay for a predetermined period of time before data is sampled in one or more embodiments.

The threshold value may be a predetermined value that may be based on vehicle testing or design requirements. In at least one embodiment, the threshold value may be indicative of a downhill road grade or road slope having a predetermined magnitude. Such a threshold value may be expressed a positive number or absolute value if data from the inclinometer 64 is expressed as a negative value for a declining slope or downward incline.

Shifting of the axle assembly 40 to a different speed ratio may not be desired on a downhill grade having a sufficient magnitude. If such a shift is not completed, the axle assembly 40 may end up in a neutral position resulting in reduced vehicle control. For instance, to downshift an axle assembly 40 having a planetary gear set from a high speed range to a low speed range, either the ring gear has to speed up or the wheels have to slow down to allow the axle gears to synchronize. On a downhill grade, the wheels will tend to speed up rather than slow down. As a result, the ring gear must be accelerated to synchronize speeds. If sufficient acceleration of the ring gear is not possible, such as when the engine speed is governed, synchronization may not be achieved to allow the shift to be completed. If the shift is not completed, the axle assembly 40 will be in neither the high nor low speed range and drivetrain retardation may be lost.

If the vehicle tilt or road grade exceeds the threshold value, then the method continues a block 106. If the vehicle tilt or road grade does not exceed the threshold value, then the method continues at block 108.

At block 106, shifting of the axle assembly 40 between speed ranges or from one speed range to another is inhibited. Shifting may be inhibited in different ways depending on the configuration of the drive axle system 34. In an embodiment that has a range control valve 56 but not an interrupt valve 58, the range control valve 56 may not be actuated when a shift is requested. As such, the axle shift unit 42 may not actuate or shift the axle assembly 40 to a different gear ratio or speed range (i.e., the current speed range is maintained). In an embodiment having a range control valve 56 and an interrupt valve 58, the interrupt valve 58 may be actuated to a closed position to terminate the supply of a pressurized fluid to the range control valve 56 and the axle shift unit 42 that may otherwise facilitate the execution of a shift.

At block 108, shifting of the axle assembly 40 from one speed range to another is permitted. Shifting may be permitted or executed in different ways depending on the configuration of the drive axle system 34. In an embodiment that has a range control valve 56 but not an interrupt valve 58, the range control valve 56 may be actuated in response to a shift request. As such, the axle shift unit 42 may actuate or execute a shift to a different gear ratio or speed range. In an embodiment having a range control valve 56 and an interrupt valve 58, the interrupt valve 58 may be actuated to or remain in an open position to permit pressurized fluid to be supplied to the range control valve 56. The range control valve 56 may then be actuated or toggled to a different position (e.g., from the closed position to the open position or vice versa) to execute a shift to a different speed range.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system for a vehicle comprising:
a drive axle assembly having first and second speed ranges that provide different drive ratios to a wheel;
an axle shift unit configured to shift the drive axle assembly between the first and second speed ranges; and
an inclinometer that detects inclination of the vehicle;
wherein the axle shift unit is inhibited from shifting the drive axle assembly when inclination of the vehicle exceeds a threshold value that is indicative of a predetermined downhill road slope, wherein inclination of the vehicle is based on data from the inclinometer after a predetermined period of time has elapsed after shifting to a different speed range is requested.

2. The system of claim 1 wherein inclination of the vehicle is a moving average based on a subset of data from the inclinometer.

3. The system of claim 1 wherein the axle shift unit is fluidly coupled to a pressurized fluid source via a range control valve, wherein the range control valve is actuated to shift the drive axle assembly between the first and second speed ranges.

4. The system of claim 3 wherein the range control valve is not actuated when the inclination of the vehicle does not exceed the threshold value.

5. The system of claim 3 further comprising an interrupt valve fluidly coupled between the pressurized fluid source and the range control valve, wherein the interrupt valve is opened and the range control valve is actuated to shift the drive axle assembly between the first and second speed ranges.

6. The system of claim 5 wherein the interrupt valve is closed to prevent the axle shift unit from shifting the drive axle assembly when the inclination of the vehicle exceeds the threshold value and a shift is requested by a vehicle operator.

7. The system of claim 1 wherein the axle shift unit is always inhibited from shifting the drive axle assembly when inclination of the vehicle exceeds the threshold value.

8. A method of controlling a drive axle system for a vehicle comprising:
determining a current speed range of a two-speed drive axle that is configured to transmit torque to a vehicle traction wheel, the drive axle being shiftable between a high speed range and a low speed range;
determining whether shifting of the drive axle from the current speed range to a different speed range is requested;
determining an inclination value indicative of inclination of the vehicle when shifting is requested, wherein determining the inclination value further comprises obtaining data from an inclinometer disposed on the vehicle after a predetermined period of time has elapsed after the different speed range is requested;
comparing the inclination value to a threshold value when shifting is requested; and
inhibiting the drive axle from shifting to the different speed range when the inclination value exceeds the threshold value.

9. The method of claim 8 wherein the inclination value is a moving average based on a subset of the data from the inclinometer.

10. The method of claim 8 wherein the inclination value is a moving average based on a subset of the data.

11. The method of claim 8 wherein the threshold value is indicative of a downhill road grade.

12. The method of claim 8 wherein shifting of the drive axle from the current speed range to the different speed range is always inhibited when inclination of the vehicle exceeds the threshold value and the threshold value is indicative of a predetermined downhill road slope.

* * * * *